United States Patent
Effenberger (10) Patent No.: US 7,424,229 B2
(45) Date of Patent: Sep. 9, 2008

(54) METHODS AND APPARATUS FOR RAMAN CROSSTALK REDUCTION VIA IDLE DATA PATTERN CONTROL

(75) Inventor: Frank J. Effenberger, Freehold, NJ (US)

(73) Assignee: General Instrument Corporation, Horsham, PA (US)

( * ) Notice: Subject to any disclaimer, the term of this patent is extended or adjusted under 35 U.S.C. 154(b) by 449 days.

(21) Appl. No.: 11/023,741

(22) Filed: Dec. 28, 2004

(65) Prior Publication Data

US 2006/0140639 A1    Jun. 29, 2006

(51) Int. Cl.
*H04B 10/04* (2006.01)
(52) U.S. Cl. .......................... 398/194; 398/81; 398/159
(58) Field of Classification Search .................. 398/93, 398/94, 95, 194, 195, 196, 197, 198, 79, 398/81, 159, 193
See application file for complete search history.

(56) References Cited

U.S. PATENT DOCUMENTS

2006/0039699 A1 * 2/2006 Farmer et al. ................. 398/66

OTHER PUBLICATIONS

Article by F.J. Effenberger, H. Ichibangase, H. Yamashita entitled "Advances in Broadband Passive Optical Networking (B-PON) Technologies," (published in IEEE Communications Magazine, vol. 39, No. 12, pp. 118-124, Dec. 2001).

Presentation by Michael Aviles, Kerry Litvin, Jun Wang, Barry Colella, Frank J. Effenberger, Feng Tian entitled "Raman Crosstalk in Video Overlay PONs,"—13 pages (published in Optical Fiber Communications, Apr. 2004).

* cited by examiner

*Primary Examiner*—Christina Y Leung
(74) *Attorney, Agent, or Firm*—Larry T. Cullen (57) ABSTRACT

Methods and apparatus are provided for reducing Raman crosstalk in a wavelength-division-multiplexing (WDM) optical fiber transmission system that transmits a multiplex of channels. Idle data is sent over one or more of the channels of the WDM system in order to maintain the optical link when user data is not being sent. The idle data has an idle data pattern, which can be controlled such that a power spectral density of a signal carried by at least one channel is shifted in order to reduce Raman crosstalk between the channels. For example, the power spectral density may be shifted away from lower frequencies of the channel, and toward the higher frequencies, by controlling the idle data pattern. Alternatively, the power spectral density may be shifted towards unused frequencies of the channel, by controlling the idle data pattern.

48 Claims, 3 Drawing Sheets

FIG. 3

METHODS AND APPARATUS FOR RAMAN CROSSTALK REDUCTION VIA IDLE DATA PATTERN CONTROL

BACKGROUND OF THE INVENTION

The present invention relates to optical fiber transmission systems. More specifically, the present invention relates to methods and apparatus for reducing Raman crosstalk in a wavelength-division-multiplexing (WDM) optical fiber transmission system.

Optical fibers offer the highest capacity of any communication medium. One example of an optical fiber transmission system which has become prevalent is the Passive Optical Network (PON). In a PON, signals are carried over optical fibers using lasers, without the need for active electronics. PONs provide significant increases in network capacity, as well as significant savings in implementation costs since the use of active electronics is avoided.

International Telecommunications Standard (ITU) G.983.1 describes an Asynchronous Transfer Mode (ATM) based Passive Optical Network (PON), commonly referred to as a Broadband PON or BPON. ITU G.983.3 provides a Wavelength-division-multiplexing (WDM) enhancement to ITU G.983.1. This WDM enhancement provides a video service capability to the PON. Since video is typically a broadcast service, it is advantageous to provide a broadcast channel on the PON for broadcast video service. In ITU G.983.3, this service is provided using WDM.

WDM is an essential technology used to channelize the optical fiber. Because of nonlinear effects in the fiber, each WDM channel is potentially impaired by other WDM channels.

In WDM optical fiber transmission systems in general, and in the system described in ITU G.983.3 in particular, there is a problem with crosstalk caused by Raman interaction between the optical wavelengths. This problem is well known in the literature.

One of the important characteristics of the Raman effect is that the crosstalk is much more pronounced at low frequencies, and is attenuated at the high frequencies. Raman crosstalk is a serious problem in that it can limit the performance of the transmission system, represented as a bit error rate floor for digital signals, or a limit on the carrier-to-noise ratio for analog signals.

It would be advantageous to provide simple methods and apparatus for reducing Raman crosstalk in WDM optical fiber transmission systems. It would be further advantageous to provide such Raman crosstalk reduction in a simple manner by controlling the idle data pattern of idle data used to maintain the optical link.

The methods and apparatus of the present invention provide the foregoing and other advantages.

SUMMARY OF THE INVENTION

The present invention relates to methods and apparatus for reducing Raman crosstalk in a wavelength-division-multiplexing optical fiber transmission system for transmitting a multiplex of channels.

In an example embodiment of the present invention, idle data is sent over one or more of the channels of the wavelength-division-multiplexing (WDM) optical fiber transmission system via a transmitter. The idle data, which serves to maintain an optical link over the channel, has an idle data pattern. The idle data pattern of at least one of the channels is controlled (e.g., via a processor) such that a power spectral density of a signal carried by the at least one channel is shifted in order to reduce Raman crosstalk between the channels.

The idle data pattern of each channel may be controlled such that the power spectral density of the signal carried by each channel is shifted in order to further reduce Raman crosstalk between the channels. The idle data pattern may be controlled such that the power spectral density of the signal is shifted away from lower frequencies of the channel, and toward the higher frequencies of the channel. Alternatively, the idle data pattern may be controlled such that the power spectral density of the signal is shifted towards unused frequencies of the channel.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods and apparatus for reducing Raman crosstalk in a wavelength-division-multiplexing (WDM) optical fiber transmission system for transmitting a multiplex of channels. In many cases, at least some of the channels that are involved in the Raman process are used for data transport. A general characteristic of all data transport systems is that actual user data traffic is present only part of the time. When user data is not present, the optical transmission system will transmit idle data. In fact, most systems spend the greater part of their time sending idle data. The idle data does not convey user information, and is sent only to maintain the optical data link. The usual idle data pattern is chosen for simplicity and digital link performance issues (e.g., transition density). It has been found that by controlling the idle data pattern of the idle data, the Raman crosstalk can be reduced. The present invention provides methods and apparatus for reducing Raman crosstalk between the channels by choosing or controlling the idle data pattern sent over a one or more of the channels.

Figure 1:
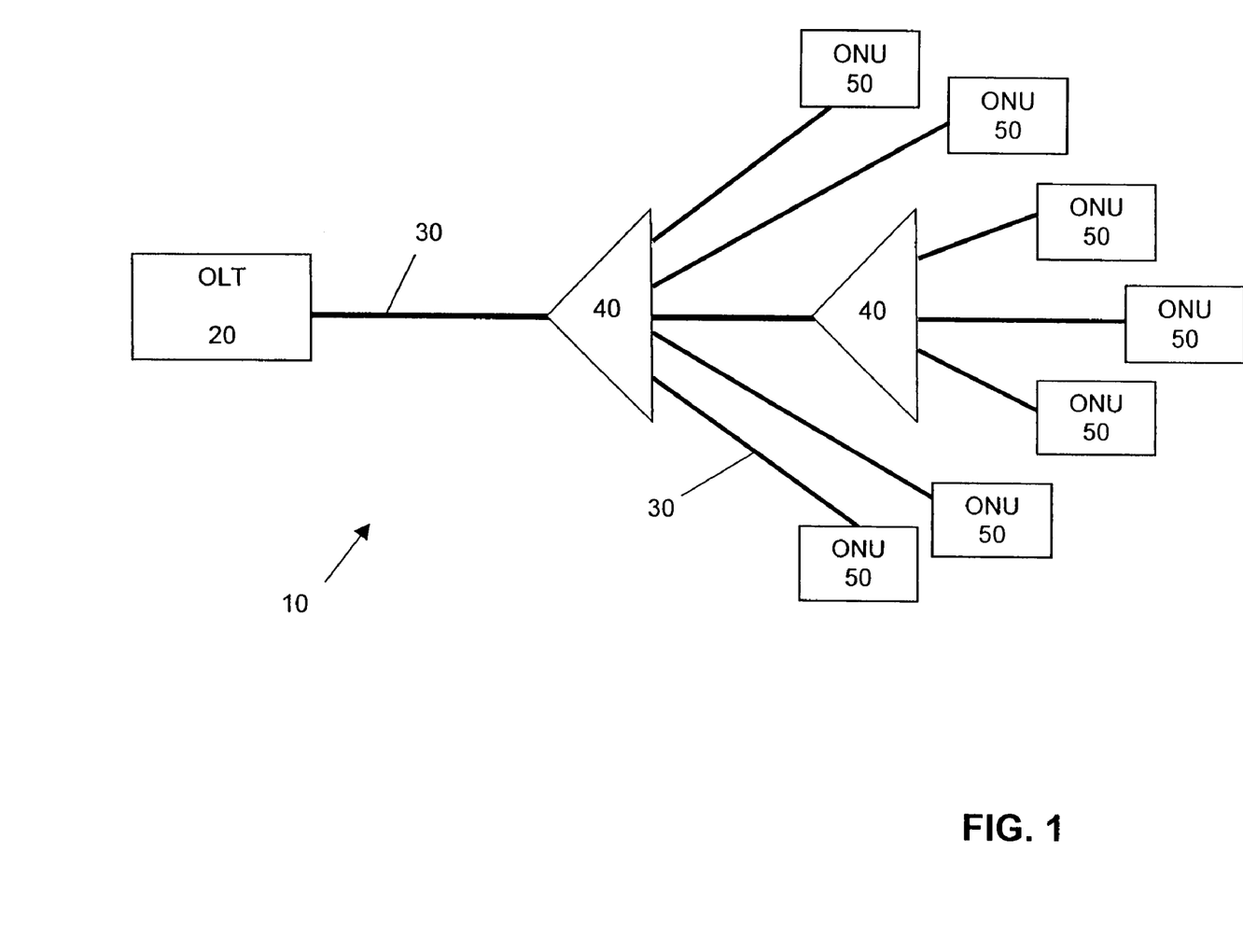
FIG. 1 shows simplified block diagram of an example embodiment of a Passive Optical Network (PON)

FIG. 1 shows a simplified example of an optical fiber transmission system in which the present invention can be implemented. In particular FIG. 1 illustrates a basic Passive Optical Network (PON) 10. An Optical Line Terminal (OLT) 20, typically located at a headend or central office of a cable and/or satellite distribution system, is used to send data using Wavelength Division Multiplexing (WDM). The OLT 20 interfaces to the service-deriving equipment via a network node interface (NNI) as is known in the art. WDM divides the optical fiber into a number of channels, which are multiplexed together for transmission over the optical fiber(s) 30. The OLT 20 sends data downstream to multiple Optical Network Units (ONUs) 50 over optical fiber(s) 30 using a wavelength window in the 1.55 μm region. Optical splitters 40 are provided for distributing the optical signal to multiple ONUs 50. Upstream communications sent from the ONUs 50 to the OLT 20 are enabled using a wavelength window in the 1.31 μm region. The ONU then interfaces to the customer with a user network interface (UNI) as is known in the art.

Figure 2:
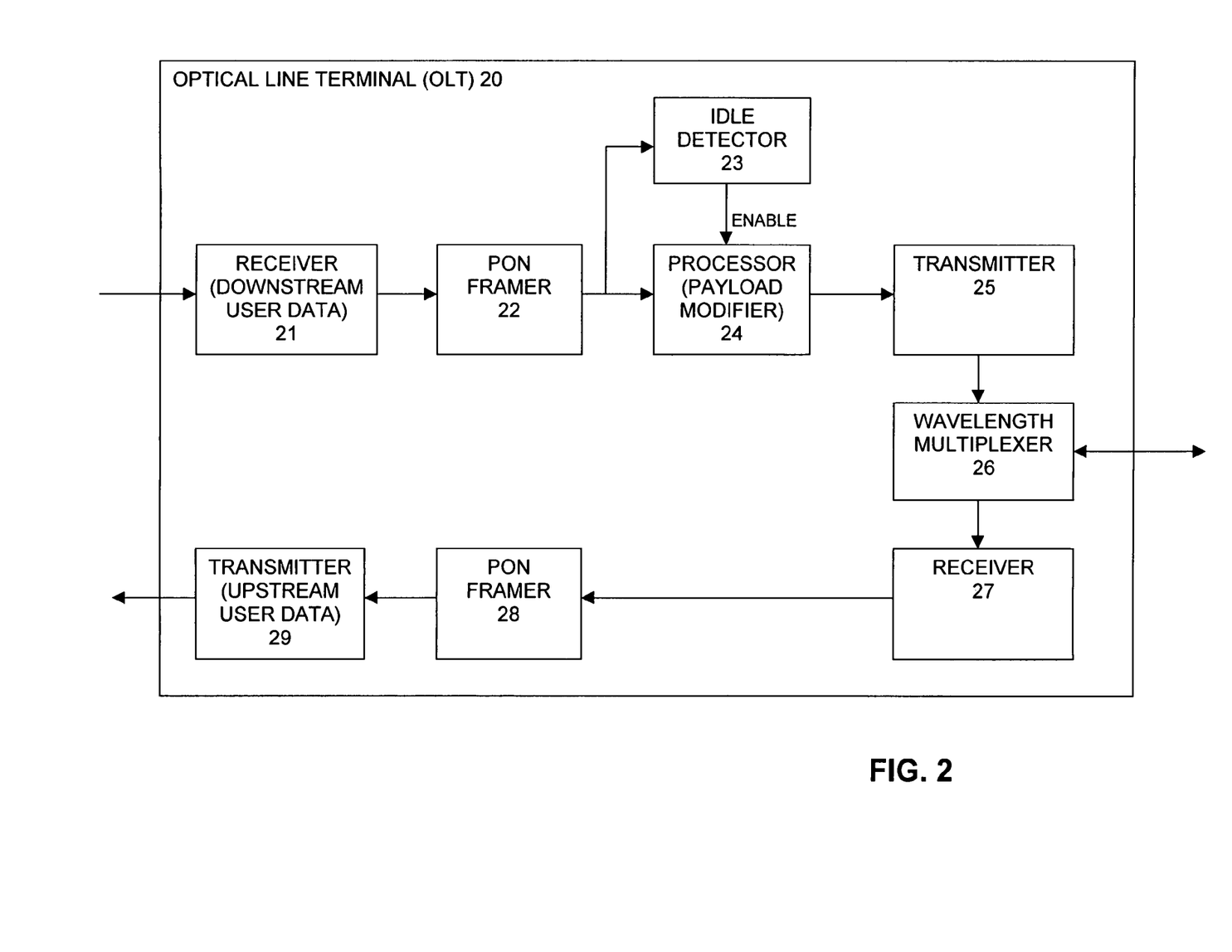
FIG. 2 shows a block diagram of an example embodiment of an Optical Line Termination Unit (OLT) in accordance with the present invention.

In order to implement the present invention, only the OLT 20 of the optical fiber transmission system 10 needs to be modified. FIG. 2 shows an example embodiment of an OLT 20 in accordance with the present invention. A receiver 21 receives data from a source, such as the system headend or central office, a satellite downlink, a cable television service provider, an Internet provider, or the like, which user data is to be transmitted downstream over the optical link to one or more users in the network. When user data is not received, idle data is sent in order to maintain the optical link. A PON framer 22 receives the downstream user data from the receiver 21 and builds the PON transmission frame structure with the user data in the payload of the frame. Each PON frame has a fixed amount of capacity, and if there is not enough user data to fill this capacity, the PON framer then inserts idle data to fill up the extra time. An idle detector 23 determines whether idle data has been generated by the framer 22. If idle data has been generated (rather than user data), the idle detector 23 enables a processor 24 (also referred to herein as a payload modifier) which modifies the idle data pattern of the idle data in order to reduce Raman crosstak, as discussed in detail below. A transmitter 25 receives the downstream user data or the modified idle data and provides this data to the wavelength multiplexer 26 for WDM multiplexing of the channels for transmission over the optical fiber 30 to the ONUs 50.

Upstream data from the ONUs 50 destined for the headend or the central office of the system 10 is received at receiver 27 via the multiplexer 26. This upstream data is then provided to PON framer 28, which builds the upstream transmission frame structure with the upstream data in the payload of the frame. The upstream user data is then forwarded upstream via transmitter 29. The upstream transmissions are immaterial to the present invention.

In an example embodiment of the present invention, idle data is sent over one or more of the channels of the wavelength-division-multiplexing optical fiber transmission system 10 via a transmitter 25 at the OLT 20. The idle data, which serves to maintain an optical link over the channel, has an idle data pattern. The idle data pattern of at least one of the channels in the multiplex of channels is controlled (e.g., via processor 24) such that a power spectral density of a signal carried by the at least one channel is shifted in order to reduce Raman crosstalk between the channels transmitted over the optical fiber 30.

By controlling the idle data pattern, the power spectral density of the resulting signal can be controlled. There are two general techniques for achieving this result. First, the idle data can be controlled by the processor 24 such that the power spectral density of the idle signal is shifted away from the lower frequencies and towards the higher frequencies of one or more of the channels. This reduces the net Raman crosstalk because the Raman effect is intrinsically a low-frequency effect. Second, the idle data can be controlled by the processor 24 such that the power spectral density of the idle signal is shifted to frequencies that are not used in one or more of the channels. This second technique does not eliminate the Raman crosstalk, but concentrates it at a frequency that is subsequently ignored by the receiver, resulting in a perceived reduction in Raman crosstalk.

This general technique of controlling the idle pattern has the following advantages:

- It does not change the basic signaling format of the data channel. For example, if the data channel is a non-return to zero (NRZ) coded channel, the controlled idle pattern is still an NRZ signal. Only the digits coded in NRZ are arbitrarily controlled. Because of this, the receiver does not detect any change in the controlled signal.
- It allows the power spectrum of the data channel to be controlled to the fraction that idle data is sent. That is, if idle data is sent 75% of the time, then the resulting spectrum may be 25% 'normal' and up to 75% 'controlled'. In general, the fraction is significant.
- It does not change the data-link format of the data channel signal. For example, in the data channel is an asynchronous transfer mode (ATM) stream formatted signal, the controlled idle pattern would be contained in the payload of the idle cells. Because these payload cells are ignored by the receiver, the receiver does not detect any abnormality in the controlled signal.

If more channels in the multiplex that carry idle data have such a controlled idle data pattern, then more Raman crosstalk will be reduced. For example, idle data in one or more of the channels may be controlled by the processor 24 to shift the power spectral density of a signal carried by those channels and reduce the Raman crosstalk. To achieve maximum reduction of the Raman crosstalk in accordance with the present invention, the idle data pattern of each of the channels in the multiplex may be controlled such that the power spectral density of the signal carried by each channel is shifted so as to reduce Raman crosstalk between the channels. Each channel in the multiplex may comprise one of a digital data channel or an analog video channel.

The optical fiber transmission system may conform to one of: (a) International Telecommunications Standard (ITU) G.983.1; (b) ITU G.983.3; (c) ITU G.984.1; (d) ITU G.984.2; (e) ITU G.984.3; and (f) International Electrical and Electronics Engineering (IEEE) 802.3ah standard.

The optical fiber transmission system 10 may comprise a Passive Optical Network (PON). The present invention may be implemented on a variety of different PONs. For example, the transmission system 10 may comprise an Asynchronous Transfer Mode (ATM) based Passive Optical Network (APON). The APON may comprise an APON with video overlay, also known as a Broadband PON (B-PON). In an APON or BPON, the idle data may comprise idle data cells, each cell having a header and a payload. The idle data cells have a 48 byte payload which can be set to any arbitrary pattern, thereby providing the means to control the spectral density of the B-PON downstream signal.

The invention may also be implemented on an Ethernet-based Passive Optical Network (EPON), or an EPON with video overlay. In an EPON, the idle data may comprise idle data frames, each frame having a header and a payload. In conventional Ethernet, the idle data pattern is a defined to be special code points in the line code; however, this does not provide the means to control the idle data pattern. To circumvent this, idle data frames can be used instead of the idle code points. The use of idle frames is not conventional in Ethernet, but it is permitted by the standard and does not require any changes in the receiving ONU 50. An idle frame would consist of an Ethernet preamble, Ethernet header, an arbitrary payload, and an Ethernet inter-packet gap. By controlling the content of the arbitrary payload, the spectral density of the EPON signal can be controlled.

In addition, the present invention may be implemented on a Gigabit Passive Optical Network (G-PON), or a GPON with video overlay. Idle data sent over a GPON may comprise idle data fragments each of which has a header and a payload. G-PON uses the G-PON encapsulation method (GEM) system to transmit data in encapsulated fragments. In conventional GEM, the idle data pattern is a defined to be special null GEM fragments; however, this does not provide the means to control the idle pattern. To circumvent this, idle data fragments can be used instead of the GEM null fragments. The use of idle data fragments is not conventional in GEM, but it is permitted by the standard and does not require any changes in the receiving ONU 50. An idle data fragment would consist of a GEM header (addressed to nobody), and an arbitrary payload. By controlling the content of the arbitrary payload, the spectral density of the G-PON signal can be controlled.

The idle data pattern of the at least one channel may be controlled by modifying at least a portion of the payload of the idle data. Modifying of the payload may comprise scrambling the payload to achieve a payload having a desired idle data pattern.

The processor 24 may control the idle data pattern of the at least one channel by replacing at least a portion of the payload of the idle data. For example, the idle data header and the payload may be scrambled, and at least a portion of the scrambled payload may be replaced to provide a desired idle data pattern. Alternatively, at least a portion of the scrambled payload may be re-coded to provide a desired idle data pattern. For example, a desired idle data pattern may resemble a Manchester coded data signal.

As an example, the present invention is particularly suitable for use in the system described in ITU G.983.3. In this system, the two channels that engage in Raman interactions are the downstream data channel and the downstream video channel. The downstream data channel is a NRZ binary amplitude shift keyed link that carries a stream of ATM cells. The ATM cells are encoded on the data link using the techniques described in 0.432. This format puts the 53 byte cells one after the other. Each cell is composed of a 5 byte header and a 48 byte payload. The transmission system normally scrambles the first four bytes of the header, and all of the payload. The scrambling process generates a bit stream that is nearly undistinguishable from a random bit sequence. Because of this randomness, the power spectrum of the data channel is equal to $Sinc^2(fT)$, where f is frequency, and T is the bit period. When the transmitter has no data to send, it will insert an idle data cell. This cell has a well-defined ATM header address, and this well-known address indicates to the receiver that this idle data cell should be discarded. The idle data cell's payload is undefined, and is conventionally set to all zeroes. Due to the scrambler, the payload of the idle data cell is randomized.

The video channel in the G.983.3 system carries sub-carrier multiplexed channels of video. Each channel is typically 6 or 8 MHz wide, and contains either a NTSC analog video channel, or a QAM digital video channel. The channel plan in North America places video channels from 50 MHz up to 770 MHz. These signals are sensitive to impairments for two primary reasons. First, each channel gets only a few percent of the optical carrier power. Second, the channels require high carrier to noise ratios (48 dBc for NTSC, 35 dBc for QAM). Thus, in the G.983.3 system, the analog video signal is generally the victim of crosstalk effects, and the digital signal is not significantly impaired by any crosstalk effect.

In practical G.983.3 applications, the Raman crosstalk is a small but significant effect. Careful engineering of the data and video links can deliver a satisfactory video quality; however, the margins for doing so are quite small. Any method to reduce the Raman effect would be useful to make the system more robust.

The present invention can reduce Raman crosstalk in the G.983.3 system. The idle data cells in the downstream data channel can be formatted such that the spectrum of the data channel is weighted towards the higher frequencies. This can be achieved by arbitrarily controlling the payload of the idle data cells. With such a method, up to $^{48}/_{53}$rds of each idle data cell (i.e., a 53 byte idle data cell having a 48 byte payload and a 5 byte header) can be controlled (approximately 90% control). If the downstream path is on average 75% idle, then the spectrum can be controlled up to $75\% \times ^{48}/_{53} = 67\%$ (i.e., controlled up to $^{2}/_{3}$rds, or 5 dB).

In the control of the idle cell payloads, it is essential that the desired idle data pattern, once obtained, must not be subsequently scrambled. This can be achieved by either replacing the idle data cell payload with the pattern after the scrambler processor, or by setting the cell payload to be the desired pattern XORed with the scrambler sequence. The former is simpler.

There are many possible idle data patterns that can be used to control the power spectral density. One simple pattern is provided by re-coding the scrambled idle data cell payload so that the resulting pattern resembles a Manchester coded data signal. This re-coding would operate as follows:

Begin with two bits in the original scrambled idle data cell payload: A, B.
Compute their exclusive OR: C=A XOR B.
Generate a Manchester representation of C for the output cell payload: not(C), C.

Figure 3:
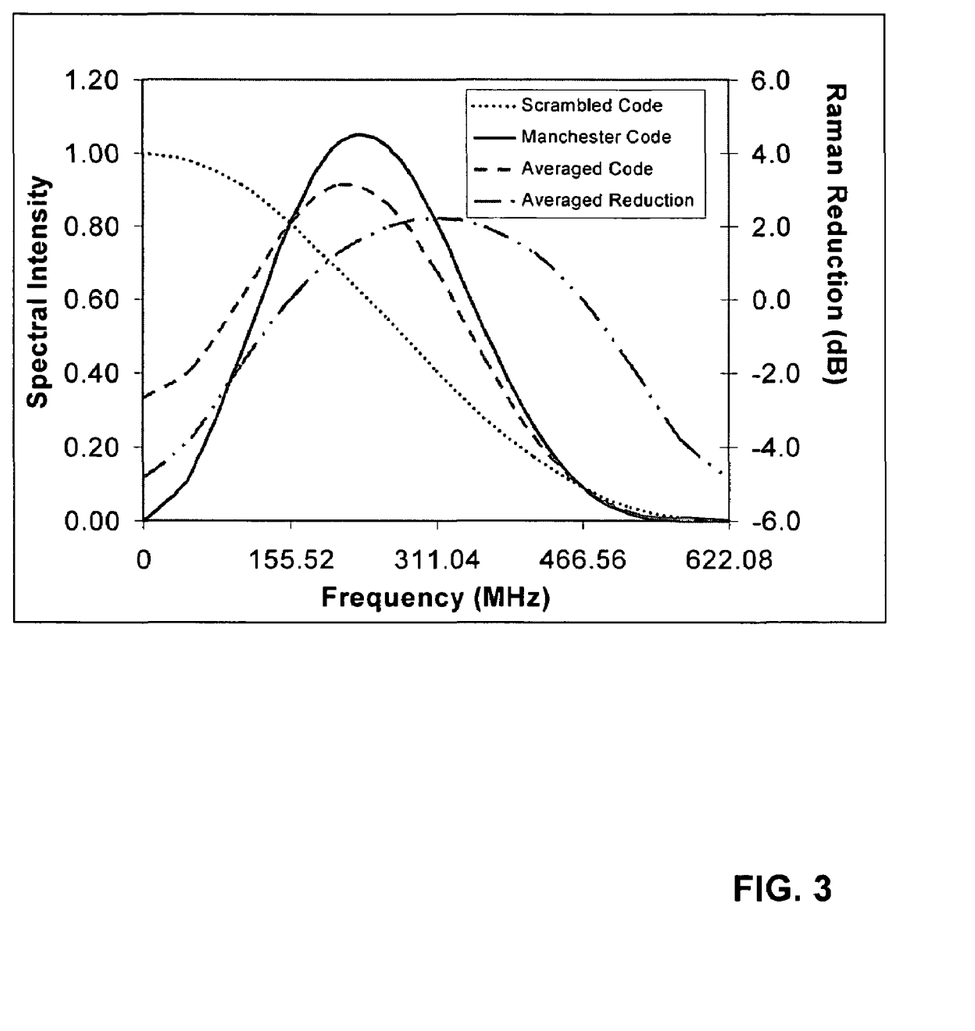
FIG. 3 shows a graph illustrating the reduction in Raman crosstalk achieved with an example embodiment of the present invention.

For example, if a byte in the incoming idle payload was equal to 00 10 01 11, then the output byte would be coded 10 01 01 10. If the payload is re-coded like this, then its power spectrum will be equal to $2*\sin^2(\pi fT)*\mathrm{sinc}^2(fT)$. FIG. 3 shows the spectral intensities for normal scrambled NRZ coded data, Manchester like re-coded idle data, and a time averaged combination, along with the Raman reduction achieved with this averaged combination. FIG. 3 illustrates that by using the claimed invention, the low frequency components of the Manchester coded data have been suppressed. At half the bit rate (311 MHz), the Manchester coded data has 3 dB higher spectral density as the scrambled NRZ coded data. At one quarter the bit rate (155.5 MHz), the Manchester coded data has the same power density as the scrambled NRZ coded data. But, at 100 MHz, Manchester coding reduces the power 3 dB, and at 50 MHz, Manchester coding reduces the power 9 dB.

Re-coding is only partially effective, depending on the fraction of time that the downstream data link is in the idle state. From the calculation given above, it is estimated that for a G.983.3 system that was 25% occupied with user data cells, the control was 67% effective. Applying this weighting factor to the above curves, we obtain the spectrum of the averaged code. This averaged code will result in a Raman crosstalk reduction with respect to the ordinary NRZ coded data as shown in FIG. 3. For example, at 52 MHz, the Raman crosstalk is reduced 3.8 dB (power), and at 104 MHz, it is reduced 1.8 dB (power). These are significant factors in practical systems.

It should also be pointed out that the limit to the reduction in this system, assuming 25% utilization, is 5 dB. Therefore, using a simple Manchester code is fairly effective. Note that other codes may also be used. In general, the code can only re-distribute the energy. So, a more complex code could move even more energy away from the low frequencies, and towards the upper frequencies. At some point, however, the energy density at higher frequencies would be high enough to become a crosstalk impairment in itself. Therefore, there is some limit to the effectiveness of more complex codes.

Also, as discussed above, Raman crosstalk may also be reduced by controlling the idle data pattern such that its energy is pushed toward unused frequencies, such as very low frequencies (below 50 MHz) which are not used for data transmission. This scheme is potentially even more powerful, in that there is no limit to the reduction of Raman energy from a theoretical perspective. However, the data channel might be impaired if extensive patterns of low transition density were sent.

As discussed above in connection with FIG. 2, the only component of an optical fiber transmission system that needs to be modified in order to implement the present invention is the OLT PON logic device 20. This device has the responsibility of generating idle data cells in the downstream channel. There are no other impacts to the system components in implementing the present invention.

It should now be appreciated that the present invention provides advantageous methods and apparatus for reducing Raman crosstalk in a wavelength-division-multiplexing optical fiber transmission system.

Although the invention has been described in connection with various illustrated embodiments, numerous modifications and adaptations may be made thereto without departing from the spirit and scope of the invention as set forth in the claims.

What is claimed is:

1. A method for reducing Raman crosstalk in a wavelength-division-multiplexing optical fiber transmission system for transmitting a multiplex of channels, comprising:
   sending idle data over one or more of the channels to maintain an optical link, said idle data having an idle data pattern; and
   controlling the idle data pattern of at least one of said channels such that a power spectral density of a signal carried by said at least one channel is shifted in order to reduce Raman crosstalk between the channels,
   wherein: the power spectral density is shifted away from lower frequencies of the channel.

2. A method in accordance with claim 1, wherein:
   the idle data pattern of each channel is controlled such that the power spectral density of the signal carried by each channel is shifted in order to reduce Raman crosstalk between the channels.

3. A method in accordance with claim 1, wherein:
   said optical fiber transmission system comprises a Passive Optical Network (PON).

4. A method in accordance with claim 1, wherein:
   said optical fiber transmission system comprises one of: (a) an Asynchronous Transfer Mode (ATM) based Passive Optical Network (APON); (b) an Ethernet-based Passive Optical Network (EPON); and (c) a Gigabit Passive Optical Network (G-PON).

5. A method in accordance with claim 4, wherein:
   (a) said APON comprises an APON with video overlay (B-PON);
   (b) said EPON comprises an EPON with video overlay; and
   (c) said GPON comprises a G-PON with video overlay.

6. A method in accordance with claim 1, wherein:
   each channel comprises one of a digital data channel or an analog video channel.

7. A method in accordance with claim 1, wherein:
   the idle data comprises one of: (a) idle data cells; (b) idle data frames; and (c) idle data fragments, each of which has a header and a payload; and
   said idle data pattern of the at least one channel is controlled by modifying at least a portion of the payload of the idle data.

8. A method in accordance with claim 7, wherein:
   said modifying of the payload comprises scrambling the payload to achieve a payload having a desired idle data pattern.

9. A method in accordance with claim 1, wherein:
   the idle data comprises one of: (a) idle data cells; (b) idle data frames; and (c) idle data fragments, each of which has a header and a payload; and
   said idle data pattern of the at least one channel is controlled by replacing at least a portion of the payload of the idle data.

10. A method in accordance with claim 9, further comprising:
    scrambling the idle data header and payload; and
    replacing at least a portion of the scrambled payload to provide a desired idle data pattern.

11. A method in accordance with claim 9, further comprising:
    scrambling the idle data header and payload; and
    re-coding at least a portion of the scrambled payload to provide a desired idle data pattern.

12. A method in accordance with claim 11, wherein:
    the desired idle data pattern resembles a Manchester coded data signal.

13. A method for reducing Raman crosstalk in a wavelength-division-multiplexing optical fiber transmission system for transmitting a multiplex of channels, comprising:
    sending idle data over one or more of the channels to maintain an optical link, said idle data having an idle data pattern; and
    controlling the idle data pattern of at least one of said channels such that a power spectral density of a signal carried by said at least one channel is shifted in order to reduce Raman crosstalk between the channels,
    wherein: the power spectral density is shifted towards unused frequencies of the channel.

14. A method in accordance with claim 13, wherein:
    the idle data pattern of each channel is controlled such that the power spectral density of the signal carried by each channel is shifted in order to reduce Raman crosstalk between the channels.

15. A method in accordance with claim 13, wherein:
    said optical fiber transmission system comprises a Passive Optical Network (PON).

16. A method in accordance with claim 13, wherein:
    said optical fiber transmission system comprises one of: (a) an Asynchronous Transfer Mode (ATM) based Passive Optical Network (APON); (b) an Ethernet-based Passive Optical Network (EPON); and (c) a Gigabit Passive Optical Network (G-PON).

17. A method in accordance with claim 16, wherein:
    (a) said APON comprises an APON with video overlay (B-PON);
    (b) said EPON comprises an EPON with video overlay; and
    (c) said GPON comprises a G-PON with video overlay.

18. A method in accordance with claim 13, wherein:
    each channel comprises one of a digital data channel or an analog video channel.

19. A method in accordance with claim 13, wherein:
the idle data comprises one of: (a) idle data cells; (b) idle data frames; and (c) idle data fragments, each of which has a header and a payload; and
said idle data pattern of the at least one channel is controlled by modifying at least a portion of the payload of the idle data.

20. A method in accordance with claim 19, wherein:
said modifying of the payload comprises scrambling the payload to achieve a payload having a desired idle data pattern.

21. A method in accordance with claim 13, wherein:
the idle data comprises one of: (a) idle data cells; (b) idle data frames; and (c) idle data fragments, each of which has a header and a payload; and
said idle data pattern of the at least one channel is controlled by replacing at least a portion of the payload of the idle data.

22. A method in accordance with claim 21, further comprising:
scrambling the idle data header and payload; and
replacing at least a portion of the scrambled payload to provide a desired idle data pattern.

23. A method in accordance with claim 21, further comprising:
scrambling the idle data header and payload; and
re-coding at least a portion of the scrambled payload to provide a desired idle data pattern.

24. A method in accordance with claim 23, wherein:
the desired idle data pattern resembles a Manchester coded data signal.

25. An apparatus for reducing Raman crosstalk in a wavelength-division-multiplexing optical fiber transmission system for transmitting a multiplex of channels, comprising:
a transmitter for sending idle data over one or more of the channels to maintain an optical link, said idle data having an idle data pattern; and
a processor for controlling the idle data pattern of at least one of said channels such that a power spectral density of a signal carried by said at least one channel is shifted in order to reduce Raman crosstalk between the channels, wherein: the power spectral density is shifted away from lower frequencies of the channel.

26. An apparatus in accordance with claim 25, wherein:
the idle data pattern of each channel is controlled such that the power spectral density of the signal carried by each channel is shifted in order to reduce Raman crosstalk between the channels.

27. An apparatus in accordance with claim 25, wherein:
said optical fiber transmission system comprises a Passive Optical Network (PON).

28. An apparatus in accordance with claim 25, wherein:
said optical fiber transmission system comprises one of: (a) an Asynchronous Transfer Mode (ATM) based Passive Optical Network (APON); (b) an Ethernet-based Passive Optical Network (EPON); and (c) a Gigabit Passive Optical Network (G-PON).

29. An apparatus in accordance with claim 28, wherein:
(a) said APON comprises an APON with video overlay (B-PON);
(b) said EPON comprises an EPON with video overlay; and
(c) said GPON comprises a G-PON with video overlay.

30. An apparatus in accordance with claim 25, wherein:
each channel comprises one of a digital data channel or an analog video channel.

31. An apparatus in accordance with claim 25, wherein:
the idle data comprises at least one of: (a) idle data cells; (b) idle data frames; and (c) idle data fragments, each of which has a header and a payload; and
said idle data pattern of the at least one channel is controlled by modifying at least a portion of the payload of the idle data.

32. An apparatus in accordance with claim 31, wherein:
said modifying of the payload comprises scrambling the payload to achieve a payload having a desired idle data pattern.

33. An apparatus in accordance with claim 25, wherein:
the idle data comprises at least one of: (a) idle data cells; (b) idle data frames; and (c) idle data fragments, each of which has a header and a payload; and
said idle data pattern of the at least one channel is controlled by replacing at least a portion of the payload of the idle data.

34. An apparatus in accordance with claim 33, further comprising:
scrambling the idle data header and payload; and
replacing at least a portion of the scrambled payload to provide a desired idle data pattern.

35. An apparatus in accordance with claim 33, further comprising:
scrambling the idle data header and payload; and
re-coding at least a portion of the scrambled payload to provide a desired idle data pattern.

36. An apparatus in accordance with claim 35, wherein:
the desired idle data pattern resembles a Manchester coded data signal.

37. An apparatus for reducing Raman crosstalk in a wavelength-division-multiplexing optical fiber transmission system for transmitting a multiplex of channels, comprising:
a transmitter for sending idle data over one or more of the channels to maintain an optical link, said idle data having an idle data pattern; and
a processor for controlling the idle data pattern of at least one of said channels such that a power spectral density of a signal carried by said at least one channel is shifted in order to reduce Raman crosstalk between the channels, wherein: the power spectral density is shifted towards unused frequencies of the channel.

38. An apparatus in accordance with claim 37, wherein:
the idle data pattern of each channel is controlled such that the power spectral density of the signal carried by each channel is shifted in order to reduce Raman crosstalk between the channels.

39. An apparatus in accordance with claim 37, wherein:
said optical fiber transmission system comprises a Passive Optical Network (PON).

40. An apparatus in accordance with claim 37, wherein:
said optical fiber transmission system comprises one of: (a) an Asynchronous Transfer Mode (ATM) based Passive Optical Network (APON); (b) an Ethernet-based Passive Optical Network (EPON); and (c) a Gigabit Passive Optical Network (G-PON).

41. An apparatus in accordance with claim 40, wherein:
(a) said APON comprises an APON with video overlay (B-PON);
(b) said EPON comprises an EPON with video overlay; and
(c) said GPON comprises a G-PON with video overlay.

42. An apparatus in accordance with claim 37, wherein:
each channel comprises one of a digital data channel or an analog video channel.

43. An apparatus in accordance with claim 37, wherein:

the idle data comprises at least one of: (a) idle data cells; (b) idle data frames; and (c) idle data fragments, each of which has a header and a payload; and said idle data pattern of the at least one channel is controlled by modifying at least a portion of the payload of the idle data.

44. An apparatus in accordance with claim 43, wherein:

said modifying of the payload comprises scrambling the payload to achieve a payload having a desired idle data pattern.

45. An apparatus in accordance with claim 37, wherein:

the idle data comprises at least one of: (a) idle data cells; (b) idle data frames; and (c) idle data fragments, each of which has a header and a payload; and said idle data pattern of the at least one channel is controlled by replacing at least a portion of the payload of the idle data.

46. An apparatus in accordance with claim 45, further comprising:

scrambling the idle data header and payload; and replacing at least a portion of the scrambled payload to provide a desired idle data pattern.

47. An apparatus in accordance with claim 45, further comprising:

scrambling the idle data header and payload; and re-coding at least a portion of the scrambled payload to provide a desired idle data pattern.

48. An apparatus in accordance with claim 47, wherein:

the desired idle data pattern resembles a Manchester coded data signal.

\* \* \* \* \*

UNITED STATES PATENT AND TRADEMARK OFFICE
CERTIFICATE OF CORRECTION

PATENT NO. : 7,424,229 B2  Page 1 of 1
APPLICATION NO. : 11/023741
DATED : September 9, 2008
INVENTOR(S) : Effenberger It is certified that error appears in the above-identified patent and that said Letters Patent is hereby corrected as shown below:

ON THE TITLE PAGE:
--Item (57), under "ABSTRACT", in Column 2, Line 11, delete "toward" and insert --towards--

--In Column 3, Line 32, delete "crosstak," and insert --crosstalk,--

--In Column 5, Line 41, delete "0.432." and insert --I.432.--

Signed and Sealed this

Twenty-seventh Day of October, 2009

David J. Kappos
*Director of the United States Patent and Trademark Office*